(12) United States Patent
Suzuki et al.

(10) Patent No.: US 8,508,348 B2
(45) Date of Patent: Aug. 13, 2013

(54) VEHICLE CAPABLE OF INDICATING A POSITION OF AN ELECTRIC POWER-RECEIVING UNIT

(75) Inventors: Naoto Suzuki, Fujinomiya (JP); Motohiro Nakashima, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 907 days.

(21) Appl. No.: 12/450,789

(22) PCT Filed: May 9, 2008

(86) PCT No.: PCT/JP2008/058998
§ 371 (c)(1),
(2), (4) Date: Oct. 13, 2009

(87) PCT Pub. No.: WO2008/143155
PCT Pub. Date: Nov. 27, 2008

(65) Prior Publication Data
US 2010/0045450 A1 Feb. 25, 2010

(30) Foreign Application Priority Data
May 11, 2007 (JP) ................................. 2007-127039

(51) Int. Cl.
*B60Q 1/00* (2006.01)
(52) U.S. Cl.
USPC ..................... 340/425.5; 340/573.1; 340/687; 340/691.1; 340/692; 362/464
(58) Field of Classification Search
USPC ................. 340/573.1, 573.4, 539.11, 539.13, 340/5.61, 5.64, 5.72, 10.1, 10.5, 691.1, 691.4, 340/691.5, 692, 687, 686.4, 636.19; 362/459, 362/464
See application file for complete search history.

(56) References Cited

U.S. PATENT DOCUMENTS
2010/0026238 A1  2/2010  Suzuki et al.

FOREIGN PATENT DOCUMENTS

| JP | A 6-325834 | 11/1994 |
|---|---|---|
| JP | A 7-87607 | 3/1995 |
| JP | A 9-161898 | 6/1997 |
| JP | A 2002-211311 | 7/2002 |
| JP | A 2005-133529 | 5/2005 |
| JP | A 2007-68358 | 3/2007 |
| JP | A-2008-254700 | 10/2008 |

OTHER PUBLICATIONS

Nov. 29, 2011 Japanese Office Action issued in Japanese Patent Application No. 2007-127039 (with translation).

*Primary Examiner* — Thomas Mullen
(74) *Attorney, Agent, or Firm* — Oliff & Berridge, PLC

(57) ABSTRACT

A communication unit (32) periodically transmits a request signal toward a prescribed range. When a transmitter (30) exists in the range where the request signal can be received, it sends identification information in a responsive manner. A comparison ECU (48) compares the identification information provided from the communication unit (32) with a predetermined value, and if both of them match with each other, notifies a matching notification to a power source management ECU (44). On receipt of the matching notification from the comparison ECU (48), the power source management ECU (44) notifies a lighting-up request for providing an instruction for lighting-up of a light-emitting unit (202) to a body ECU (46). Upon receipt of the lighting-up request, the body ECU (46) activates a lighting-up command LON. As a result, the light-emitting unit (202) is lit up and notifies a user of the position of a charging port.

8 Claims, 12 Drawing Sheets

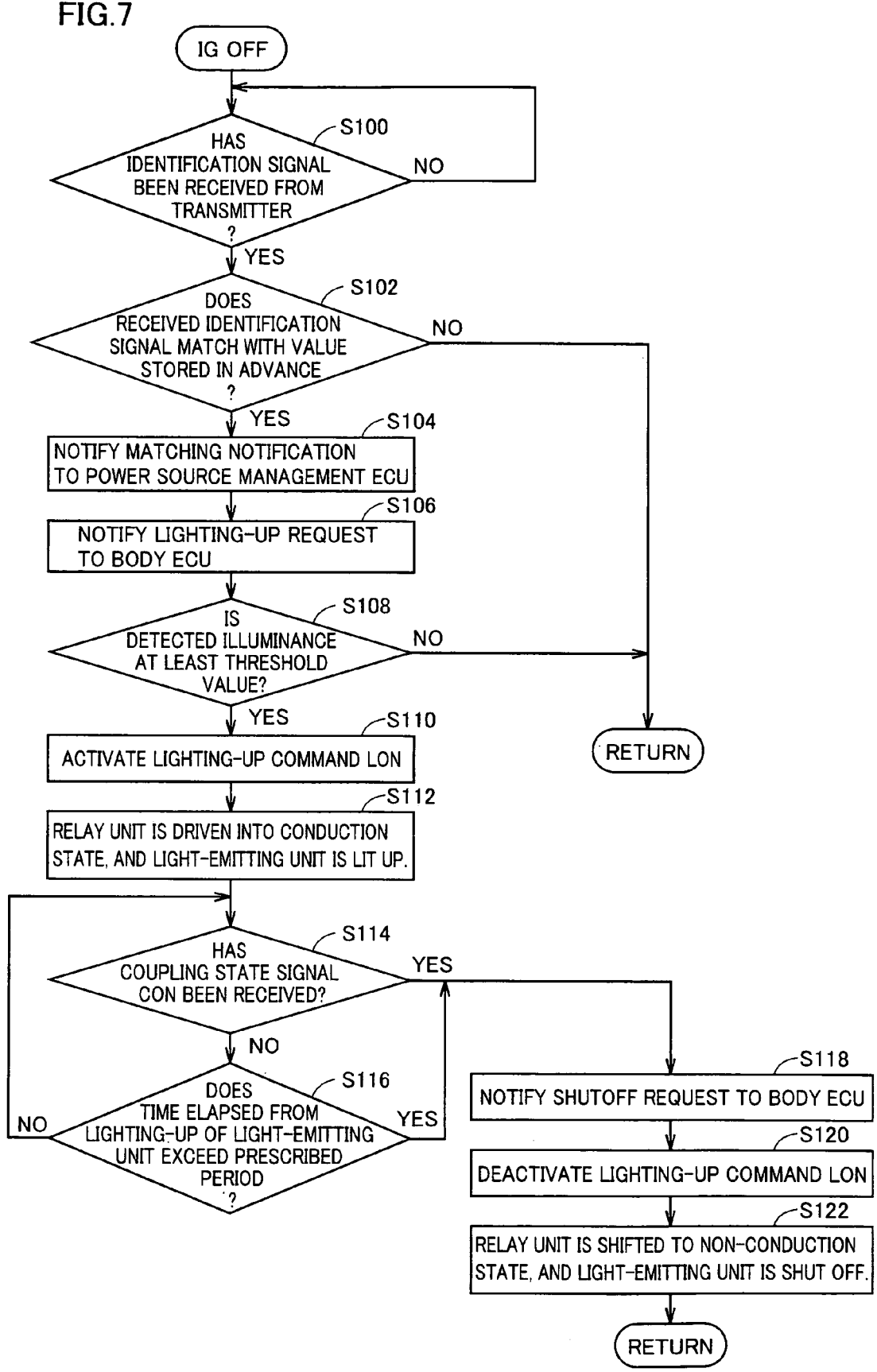

VEHICLE CAPABLE OF INDICATING A POSITION OF AN ELECTRIC POWER-RECEIVING UNIT

TECHNICAL FIELD

The present invention relates to a vehicle capable of utilizing electric power supplied from an external power source.

BACKGROUND ART

A so-called electric-powered vehicle such as an electric vehicle, a hybrid vehicle, or a fuel-cell vehicle is mounted with a power storage device made of a secondary battery, a capacitor, or the like, and travels by using driving force generated by electric power stored in the relevant power storage device.

An electric vehicle does not have an electric power-generating mechanism configured with an engine, and thus it has conventionally been required to store electric power to be used for traveling in the power storage device mounted thereon, from an external power source such as a commercial power source. In addition, as to an electric-powered vehicle such as a hybrid vehicle or a fuel-cell vehicle, which has an electric power-generating mechanism, there has also been proposed a technique of charging the power storage device mounted thereon with use of a commercial power source or the like having high electric power-generating efficiency to thereby achieve higher fuel consumption efficiency. In particular, attention has been focused on a configuration that uses a commercial power source supplied to each household and having a relatively low voltage (e.g. 100 V or 200 V) to charge the power storage device mounted on the electric-powered vehicle.

A location where fuel (e.g. petrol) for operating an engine is resupplied is limited to a location such as a fueling station, whereas a location where a power storage device mounted on an electric-powered vehicle is externally charged is less limited. In particular, if it is possible to use a commercial power source having a relatively low voltage for external charging, it becomes possible to externally charge an electric-powered vehicle while parking the vehicle in, for example, a garage of each household.

In the case that the electric-powered vehicle is externally charged in a garage of each household, a lighting fixture is not always fully equipped, in contrast to the case that fuel is resupplied at the fueling station. Accordingly, from the viewpoint of further facilitating an operation of coupling a charging connector for external charging to the electric-powered vehicle at night or the like, there has been proposed a configuration in which a lighting fixture is provided at the vehicle or at the charging connector. For example, charging connectors for an electric vehicle disclosed in Japanese Patent Laying-Open No. 06-325834 are identified as connectors arranged at the vehicle and at a charger, and capable of being fitted into each other. A connector housing located at any one of the vehicle and the charger is provided with light-emitting means.

Further, a lighting device for a vehicle disclosed in Japanese Patent Laying-Open No. 2002-211311 includes lighting means for lighting vehicle surroundings by lighting up, identification signal transmitting means carried by an owner of the vehicle and for transmitting an identification signal with which the owner of the vehicle is identified, and in-vehicle control means for receiving the identification signal transmitted by the identification signal transmitting means and controlling lighting-up of the lighting means.

Generally, a charging port provided at the vehicle, which is to be coupled to the charging connector, is provided with a lid portion to prevent intrusion of water and the like into the charging port when external charging is not performed. The charging port is therefore closed with the lid portion before the charging connector is coupled thereto. Accordingly, as disclosed in Japanese Patent Laying-Open No. 06-325834, even if a lamp is provided in a housing provided at the vehicle, there arises a problem of difficulties for a vehicle user in visually perceiving the position of the charging port in the case that vehicle surroundings are dark. Japanese Patent Laying-Open No. 2002-211311 merely discloses lighting-up of a door mirror lamp or a roof lamp, and is not intended for a challenge to enable the user to easily detect the position of the charging port.

Therefore, the user has to search for the position of the charging port with the help of some kind of light, and thus resulting in a problem of causing the user to feel burdensome.

DISCLOSURE OF THE INVENTION

The present invention has been made to solve such problems, and an object of the present invention is to provide a vehicle that enables a user to easily find out the position of a charging connector regardless of the circumstances of vehicle surroundings.

A vehicle according to a certain aspect of the present invention provides a vehicle capable of utilizing electric power supplied from an external power source. The vehicle includes: an electric power-receiving unit for receiving the electric power; a sensing unit for sensing an identification signal issued from a transmitter; and an indication unit for indicating a position of the electric power-receiving unit. The indication unit is configured to provide an operation when the identification signal sensed by the sensing unit matches with a value specific to the vehicle.

Preferably, the vehicle further includes a determination unit for determining whether or not supply of the electric power from the external power source is required. The indication unit provides the operation when the determination unit determines that the supply of the electric power from the external power source is required.

Preferably, the sensing unit senses a distance between the vehicle and the transmitter, and the indication unit changes a state of the operation in accordance with the distance between the vehicle and the transmitter, sensed by the sensing unit.

Preferably, the indication unit includes a light-emitting unit disposed in proximity to the electric power-receiving unit, and the operation of the indication unit includes an operation of allowing the light-emitting unit to light up or blink.

More preferably, a radiating surface of the light-emitting unit is formed as a part of a surface of a vehicle main body of the vehicle.

Preferably, the indication unit includes a sound-generating unit disposed in proximity to the electric power-receiving unit, and the operation of the indication unit includes generation of a sound from the sound-generating unit.

Preferably, the vehicle further includes an engine operated by combustion of fuel, a fuel storage unit for storing the fuel, and a fuel-receiving port for receiving the fuel, brought into communication with the fuel storage unit.

More preferably, the electric power-receiving unit is disposed at a side surface of the vehicle on one side, the fuel-receiving port is disposed at a side surface of the vehicle on the other side, and the indication unit is disposed at the side surface at which the electric power-receiving unit is disposed.

According to the present invention, it is possible to implement a vehicle that enables a user to easily find out the position of a charging connector regardless of the circumstances of vehicle surroundings.

BRIEF DESCRIPTION OF THE DRAWINGS

FIG. 7 is a flowchart that shows a procedure for indicating the position of the charging port according to the first embodiment of the present invention.

BEST MODES FOR CARRYING OUT THE INVENTION

Figure 1:
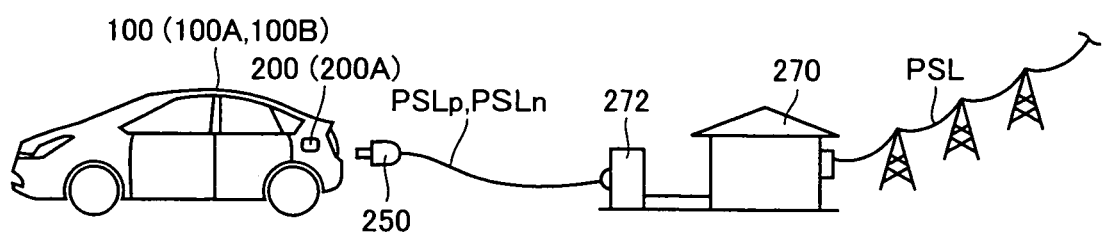
FIG. 1 is a schematic configuration diagram of a system for externally charging an electric-powered vehicle according to a first embodiment of the present invention.

Embodiments of the present invention will hereinafter be described in detail with reference to the drawings. Note that the same or corresponding portions in the drawings are provided with the same reference characters and the description thereof will not be repeated.

First Embodiment

In an embodiment of the present invention described below, description will be made on an electric-powered vehicle 100 identified as a hybrid vehicle, as an example. However, the embodiment of the present invention is not limited thereto. In the present specification, the electric-powered vehicle is a generic term used to refer to a vehicle mounted with a power storage device and capable of generating driving force for traveling purpose by electric power supplied from the relevant power storage device, and includes an electric vehicle, a fuel-cell vehicle, and the like, in addition to the hybrid vehicle.

Electric-powered vehicle (hereinafter also referred to as vehicle) 100 according to a first embodiment of the present invention is mounted with an engine, and an electric motor that is rotatably driven by electric power supplied from a mounted power storage device, and achieves high fuel consumption efficiency by allowing each of the engine and the electric motor to generate driving force at an optimally-allocated rate. Further, the power storage device mounted on vehicle 100 can be charged with use of an external power source (an example of which is a commercial power source). In other words, vehicle 100 has an electric power-receiving unit that receives electric power supplied from the external power source, and utilizes the electric power received at the electric power-receiving unit. To distinguish the charging of the power storage device by means of the external power source from an operation of charging the power storage device during traveling of vehicle 100, the former is also referred to as "external charging".

(System Configuration)

FIG. 1 is a schematic configuration diagram of a system 1 for externally charging electric-powered vehicle 100 according to the first embodiment of the present invention.

With reference to FIG. 1, in system 1 according to the first embodiment of the present invention, a vehicle-charging device 272 supplies external power source to a power storage device mounted on vehicle 100. For the external power source, any type of power source may be used regardless of whether it is of a direct-current type or an alternating-current type, and what voltage value it has. As an example, it is possible to adopt, as the external power source, a commercial power source supplied to each household, a solar photovoltaic panel disposed on a roof of each household, and others. In the present embodiment, illustration will be made on a configuration that typically uses a commercial power source as the external power source.

More specifically, a charging connector 250 is connected to vehicle-charging device 272 via supply lines PSLp and PSLn made of a cab-tire cable or the like. Charging connector 250 is coupled to a charging port 200 formed at a vehicle main body (body) of vehicle 100, so that the in-vehicle power storage device is externally charged. Vehicle-charging device 272 supplies to vehicle 100 a part of the electric power supplied to a house 270 via a commercial power source supply line PSL.

Further, vehicle-charging device 272 may also include an accommodating mechanism for charging connector 250 or a take-up mechanism for supply lines PSLp and PSLn connected to charging connector 250 (both of them are not shown), and may also include a security mechanism, a billing mechanism, or the like for a user.

(Basic Configuration of Vehicle)

Figure 2:
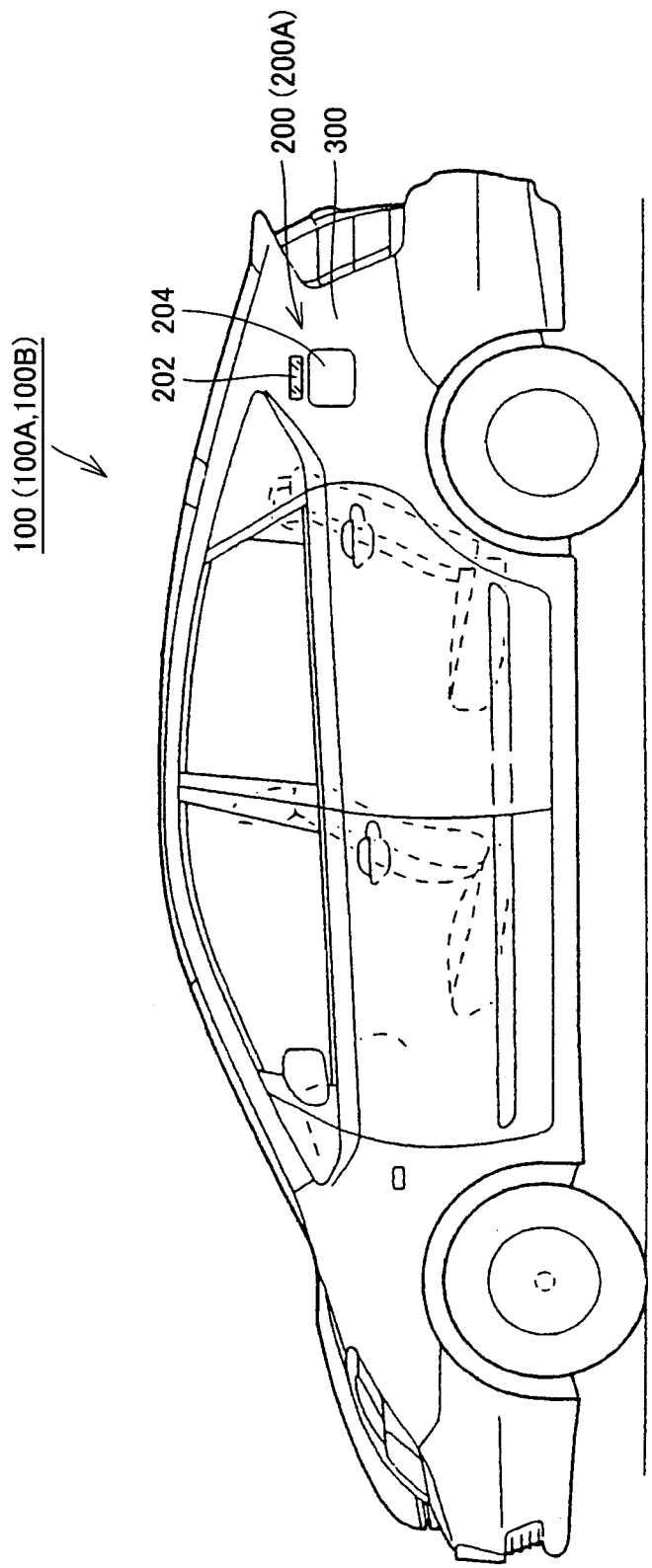
FIG. 2 is a side view of the electric-powered vehicle according to the first embodiment of the present invention.

FIG. 2 is a side view of electric-powered vehicle 100 according to the first embodiment of the present invention.

FIG. 2 shows an example in which charging port 200 is disposed rearward of the vehicle at a vehicle main body (body) 300, as an example. The position where charging port 200 is disposed may be any of forward at a side surface, at a rear surface, and at a front surface of the vehicle, instead of rearward of the vehicle.

Further, vehicle 100 according to the first embodiment is provided with a light-emitting unit 202 as an example of a configuration for indicating the position of charging port 200 to a user. Light-emitting unit 202 is for notifying the user of the position of charging port 200, and is provided at a position in proximity to charging port 200. As described below, when it is determined that a user is approaching, light-emitting unit 202 emits light toward an external space. The user can thus visually perceive the position of charging port 200 at first glance, even in the circumstances where vehicle surroundings are dark, such as at night.

Figure 3A:
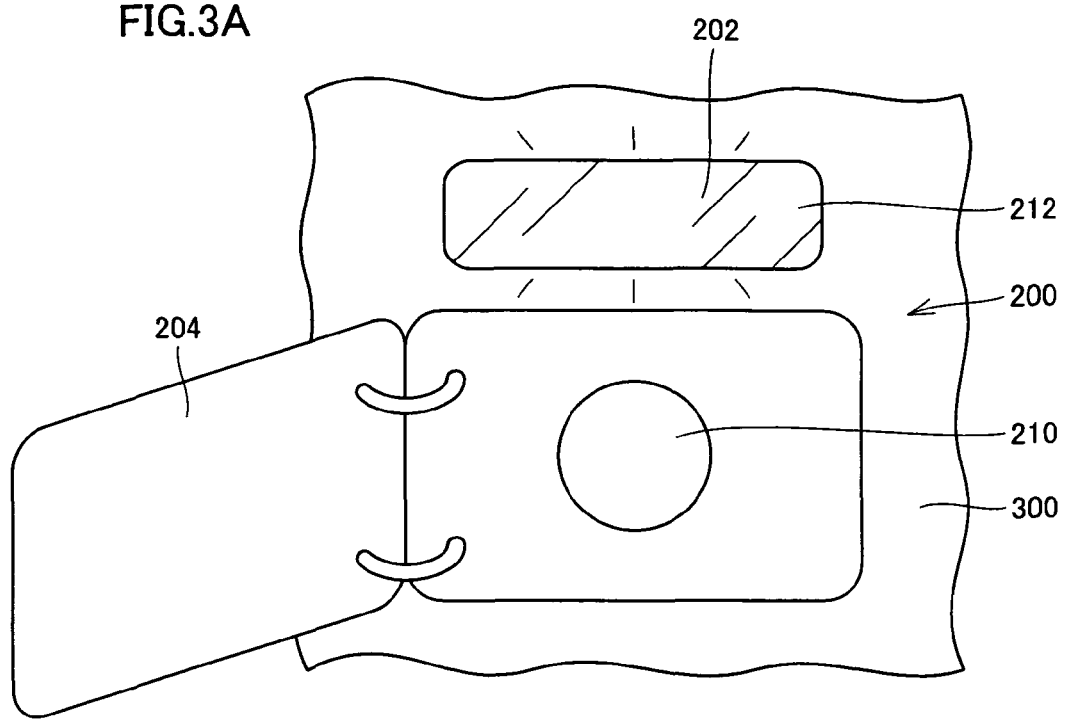
FIG. 3A and FIG. 3B are external views of a charging port and its surroundings according to the first embodiment of the present invention.
Figure 3B:
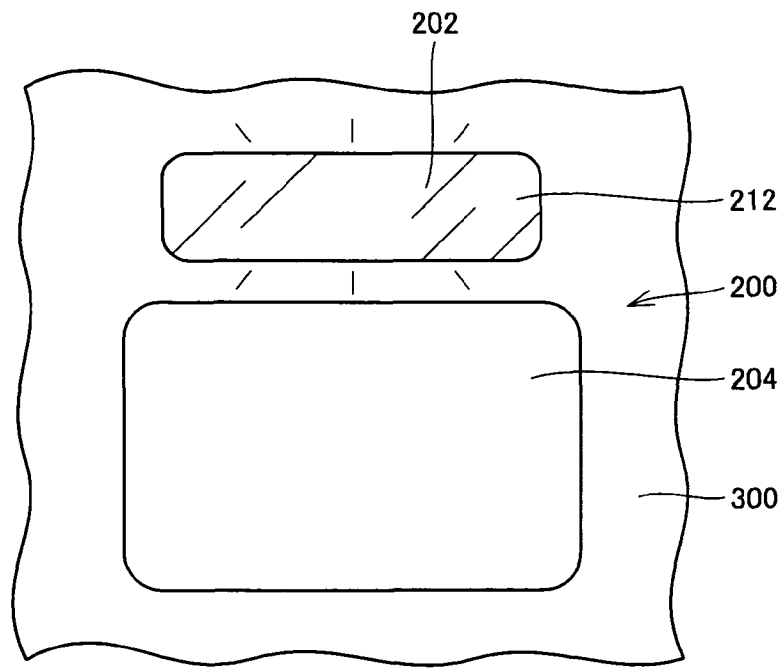

FIG. 3A and FIG. 3B are external views of charging port 200 and its surroundings according to the first embodiment of the present invention. FIG. 3A shows an opened state of a lid portion 204, while FIG. 3B shows a closed state of lid portion 204.

With reference to FIG. 3A and FIG. 3B, charging port 200 is made of an internal space formed inside vehicle main body 300 (on the main body side) and opened toward an external space outside vehicle main body 300, and lid portion 204 for preventing intrusion of water, dust, and others into the relevant internal space. The internal space accommodates an electric power-receiving unit (electrode) 210 to be coupled to the charging connector. Further, lid portion 204 is swingably connected, so that turning of lid portion 204 causes charging port 200 to be closed or opened.

Light-emitting unit 202 is provided in proximity to an upper portion of charging port 200. Light-emitting unit 202 includes a light source such as a filament lamp or an LED (Light Emitting Diode), and a light-emitting surface 212 for emitting light provided from the light source toward the external space. Light-emitting surface 212 is made of a light transmission member, a representative example of which is an ABS (Acrylonitrile Butadiene Styrene) resin, and formed as a part of a surface of vehicle main body 300. The position where light-emitting unit 202 is disposed is not limited thereto. Light-emitting unit 202 may be disposed inside charging port 200 or at electric power-receiving unit 210 itself, as long as it is configured to be able to emit light to an outside of the vehicle when lighting up.

Figure 4:
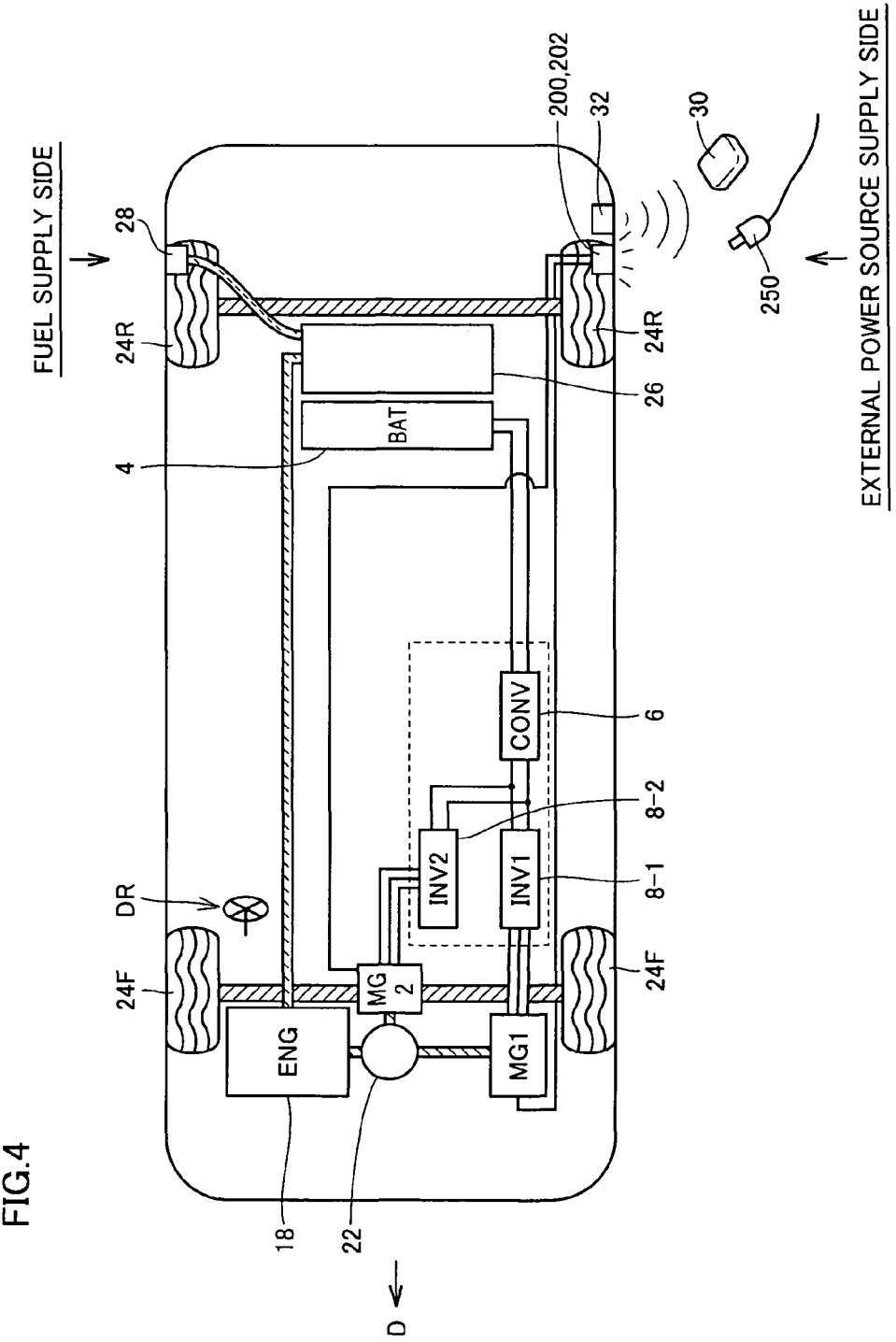
FIG. 4 is an arrangement plan view of respective members that configure the electric-powered vehicle according to the first embodiment of the present invention.

FIG. 4 is an arrangement plan view of respective members that configure electric-powered vehicle 100 according to the first embodiment of the present invention.

With reference to FIG. 4, vehicle 100 is typically a hybrid vehicle of an FF (front engine/front drive) drive type, and includes a pair of front wheels (drive wheels) 24F provided frontward along a traveling direction D, and rear wheels (driven wheel) 24R provided rearward along traveling direction D.

Vehicle 100 includes an engine ENG operated by combustion of fuel, a first motor generator MG1 capable of generating electric power by receiving a part of motive power from engine ENG, and a second motor generator MG2 operating as an electric motor by electric power supplied from at least a power storage device (BAT) 4. Internal combustion engine ENG and motor generators MG1 and MG2 are mechanically coupled to one another via a power split device 22 typically made of a planetary gear mechanism, to drive front wheels 24F.

Further, a first inverter (INV1) 8-1 and a second inverter (INV2) 8-2 are provided to optimally control the operational states of motor generators MG1 and MG2, respectively, in accordance with the traveling circumstances. Moreover, a step-up/down converter (CONV) 6 for stepping up/down a direct-current voltage is interposed between power storage device 4 and inverters 8-1 and 8-2.

A fuel tank 26 that stores fuel (a representative example of which is petrol or light oil) to be supplied to engine ENG is disposed in the rearward of vehicle 100. Further, a fuel-receiving port (a so-called filler opening) 28 for receiving fuel, brought into communication with fuel tank 26, is provided at the vehicle main body of vehicle 100.

In other words, in vehicle 100, charging port 200 is provided rearward at a left side surface with respect to traveling direction D (on the external power source supply side), while fuel-receiving port 28 is provided rearward at a right side surface with respect to traveling direction D (on the fuel supply side).

In the present embodiment, light-emitting unit 202 for indicating the position of charging port 200 to a user is provided, whereas a configuration for indicating the position of fuel-receiving port 28 is not provided. This is because it is assumed that fuel is resupplied at a fueling station or the like where a lighting fixture is relatively well-equipped, whereas external charging is often carried out at a location where a lighting fixture is not sufficiently equipped or not at all equipped, such as in a garage in each household. Moreover, it is possible to prevent the user from confusing the charging port 200 and the fuel-receiving port 28 by providing only one light-emitting unit 202 that indicates the position of charging port 200.

Particularly in vehicle 100 according to the present embodiment, a communication unit 32 capable of establishing radio communication with a transmitter 30 is provided in proximity to charging port 200. Each of communication unit 32 and transmitter 30 may have any configuration as long as it can transmit and receive a signal via a radio signal (an example of which is a radio wave, light, an infrared ray, an ultrasound, and the like). A so-called smart key system, keyless entry system, immobilizer system, or the like can be used as a typical example.

If transmitter 30 exists in a range centered at communication unit 32 and spreading therefrom by a prescribed distance (e.g. approximately a few meters), communication unit 32 can establish radio communication with transmitter 30. Accordingly, if radio communication can be established between communication unit 32 and transmitter 30, this means that a user that carries transmitter 30 exists in the prescribed range centered at communication unit 32. It is desirable that a characteristic, a disposing position, or the like of communication unit 32 is appropriately designed such that an indicating operation is performed only when a user that carries transmitter 30 approaches charging port 200.

Transmitter 30 stores an identification signal (ID) specific to corresponding vehicle 100, and sends the stored identification signal to communication unit 32 in a responsive manner. In vehicle 100, the identification signal sent by communication unit 32 in a responsive manner is compared with a value predetermined for vehicle 100 (specific value), and if both of them match with each other, light-emitting unit 202 is lit up. In other words, when transmitter 30 that stores an identification signal identical to a particular identification signal allotted to vehicle 100 exists in the prescribed range, light-emitting unit 202 is lit up and the position of charging port 200 is indicated. The "lighting-up" is a concept that includes both of a mode of continuously emitting light (continuous lighting-up) and a mode of intermittently emitting light (blinking).

Figure 5:
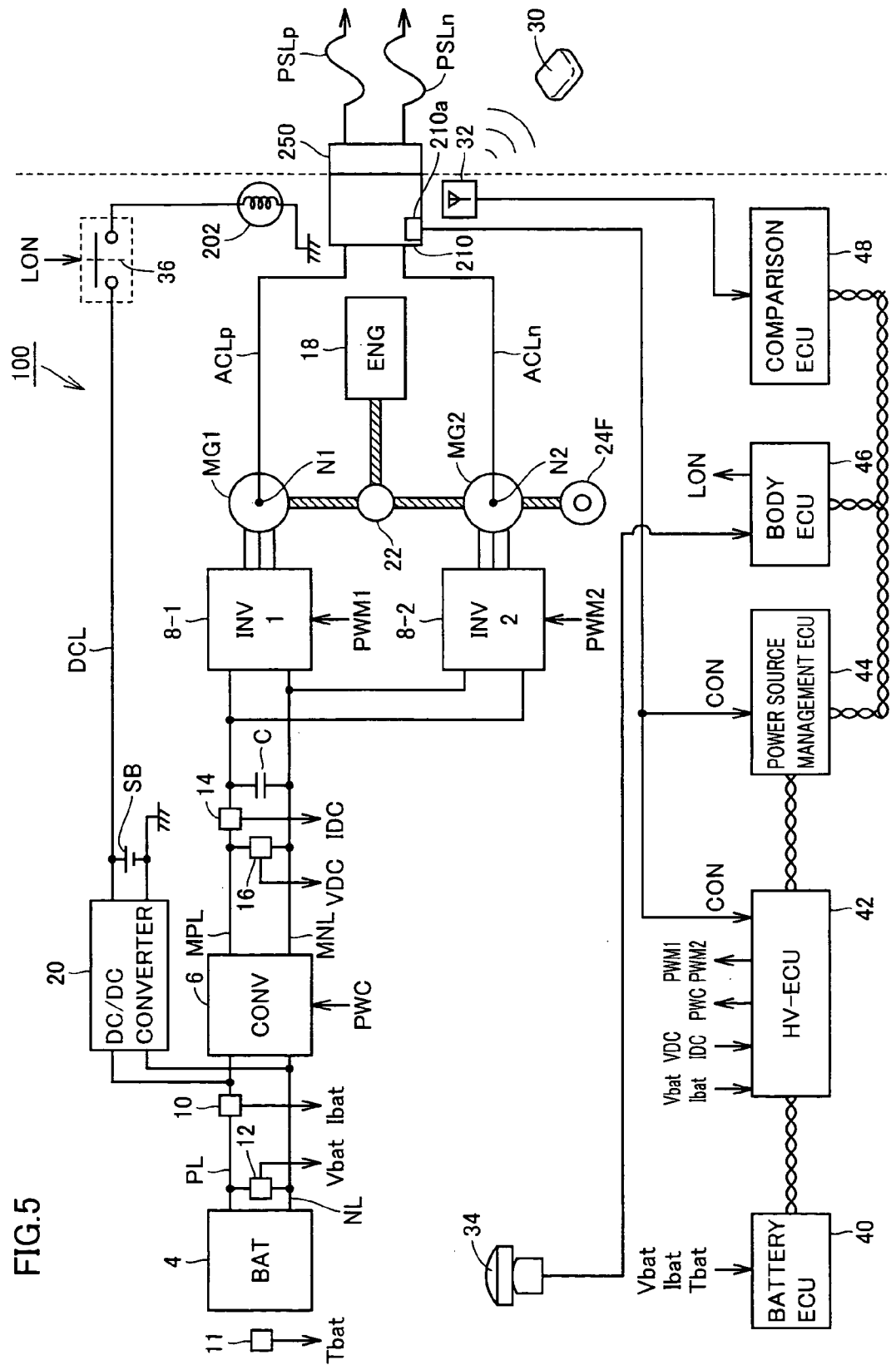
FIG. 5 is a schematic configuration diagram of the electric-powered vehicle according to the first embodiment of the present invention.

With reference to FIG. 5, engine ENG and motor generators MG1 and MG2, which are mechanically coupled to one another via power split device 22, drive front wheels 24F, as described above.

During traveling of vehicle 100 (i.e. when external charging is not performed), power split device 22 splits the driving force generated by the operation of engine ENG into two components, and allocates one of them to first motor generator MG1, and the other of them to second motor generator MG2. The driving force allocated from power split device 22 to first motor generator MG1 is used for an electric power-generating operation, while the driving force allocated to second motor generator MG2 is combined with the driving force generated at second motor generator MG2, and used for driving front wheels 24F.

At that time, inverters 8-1 and 8-2, which are made to correspond to motor generators MG1 and MG2, respectively, make conversion between direct-current electric power and alternating-current electric power. Mainly, first inverter 8-1 converts alternating-current electric power generated at first motor generator MG1 into direct-current electric power in accordance with a switching command PWM1 from an HV-ECU (Hybrid Vehicle-Electronic Control Unit) 42, and supplies the direct-current electric power to a main positive bus MPL and a main negative bus MNL. In contrast, second inverter 8-2 converts direct-current electric power supplied via main positive bus MPL and main negative bus MNL into alternating-current electric power in accordance with a switching command PWM2 from HV-ECU 42, and supplies the alternating-current electric power to second motor generator MG2.

Power storage device 4 is a rechargeable electric power storage element, and is configured with a secondary battery such as a lithium-ion battery or a nickel-hydrogen battery, or a storage element such as an electric double layer capacitor, as an example. Step-up/down converter (CONV) 6 for allowing direct-current voltages to be mutually converted is interposed between power storage device 4 and inverters 8-1 and 8-2, and allows an input/output voltage of power storage device 4 and a line voltage between main positive bus MPL and main negative bus MNL to be stepped up or stepped down bi-directionally. The step-up/down operations at step-up/down converter 6 are controlled in accordance with a switching command PWC from HV-ECU 42.

Typically, HV-ECU 42 is mainly configured with a CPU (Central Processing Unit), a memory unit such as a RAM (Random Access Memory) or a ROM (Read Only Memory), and an input/output interface unit. HV-ECU 42 executes control that relates to traveling of the vehicle and external charging, in accordance with a program stored in advance, based on information obtained from various sensors. As an example of the information inputted to HV-ECU 42, FIG. 5 shows a battery current Ibat obtained from a current sensor 10 inserted into a positive line PL, a battery voltage Vbat obtained from a voltage sensor 12 disposed between positive line PL and a negative line NL, a bus current IDC obtained from a current sensor 14 inserted into main positive bus MPL, and a bus voltage VDC obtained from a voltage sensor 16 disposed between main positive bus MPL and main negative bus MNL.

Vehicle 100 further includes a battery ECU 40 configured to be able to establish data communication with HV-ECU 42. Battery ECU 40 is a control device for managing charging and discharging of power storage device 4, and mainly monitors a charging state (SOC: State Of Charge; hereinafter also simply referred to as "SOC") of power storage device 4 sequentially, and notifies the obtained SOC to HV-ECU 42. Specifically, battery ECU 40 monitors the SOC based on battery current Ibat from current sensor 10, battery voltage Vbat from voltage sensor 12, and a battery temperature Tbat from a temperature sensor 11 disposed in proximity to power storage device 4. Similarly, battery ECU 40 is mainly configured with a CPU, a memory unit such as a RAM or a ROM, and an input/output interface unit.

Further, a DC/DC converter 20 is electrically connected in parallel to step-up/down converter 6 with respect to power storage device 4. DC/DC converter 20 steps down electric power discharged from power storage device 4 to generate auxiliary equipment electric power. The voltage of auxiliary equipment electric power is set to be lower (e.g. 12V or 24V) than the charging and discharging voltage of the power storage device (e.g. 288 V). The auxiliary equipment electric power generated at DC/DC converter 20 is supplied to various auxiliary equipment of vehicle 100, not shown, via a low-voltage supply line DCL, and a part of it is supplied to an auxiliary equipment battery SB. Auxiliary equipment battery SB is a rechargeable electric power storage element that stores auxiliary equipment electric power. With use of auxiliary equipment battery SB, auxiliary equipment electric power can be supplied to each of auxiliary equipment, even if vehicle 100 is in a halt state (ignition off state).

Further, light-emitting unit 202 for indicating the position of charging port 200 to the user is electrically connected to low-voltage supply line DCL via a relay unit 36. Relay unit 36 is driven in response to a lighting-up command LON from a body ECU 46 described below, to thereby allow light-emitting unit 202 to light up or blink.

Next, in the case that vehicle 100 is to be externally charged, charging connector 250 is coupled to charging port 200 (FIG. 1). More specifically, charging connector 250 is mechanically coupled to and electrically connected to electric power-receiving unit 210 accommodated in charging port 200, to form an electrical path between the external power source and power storage device 4.

In the present embodiment, it is assumed that a single-phase alternating-current commercial power source (its voltage value is 100 V or 200 V) is used as the external power source, and illustration will be given on a configuration in which such a single-phase alternating-current commercial power source is received in vehicle 100 via a neutral point N1 of motor generator MG1 and a neutral point N2 of motor generator MG2, to externally charge power storage device 4.

(Configuration of External Charging)

After charging connector 250 is coupled to electric power-receiving unit 210, supply lines PSLp and PSLn that transport electric power from the external power source are electrically connected to neutral point N1 of motor generator MG1 and neutral point N2 of motor generator MG2 via electric power-receiving lines ACLp and ACLn, respectively. Each of motor generators MG1 and MG2 includes a stator made of Y-connected (star-connected) three-phase coils. A point at which these coils are connected to one another in the Y-connection corresponds to each of neutral points N1 and N2.

The external power source is supplied to neutral points N1 and N2, so that a potential of supply line PSLp is applied to respective phases of first inverter 8-1 at the alternating-current ports, and a potential of supply line PSLn is applied to respective phases of second inverter 8-2 at the alternating-current ports. Inverters 8-1 and 8-2 are then allowed to appropriately perform a switching operation, so that direct-current electric power having a prescribed voltage value is supplied from inverters 8-1 and 8-2 to main positive bus MPL and main negative bus MNL.

More specifically, each of inverters 8-1 and 8-2 has three arm circuits corresponding to the respective phases (three phases) at the alternating-current ports. Each of the arm circuits includes an upper arm circuit and a lower arm circuit, each of which is made of at least one switching element. In each of inverters 8-1 and 8-2, the upper arm circuits corresponding to the respective phases are collectively caused to perform an on/off operation, and the lower arm circuits corresponding to the respective phases are also collectively caused to perform an on/off operation. As a result, in each of inverters 8-1 and 8-2, the three upper arm circuits can be regarded as being in the same switching state (all of them are on or off), and the three lower arm circuits can also be regarded as being in the same switching state. With such a switching operation, the respective phase voltages can be equal to one another. Such a switching mode is also referred to as a zero-phase mode.

Figure 6:
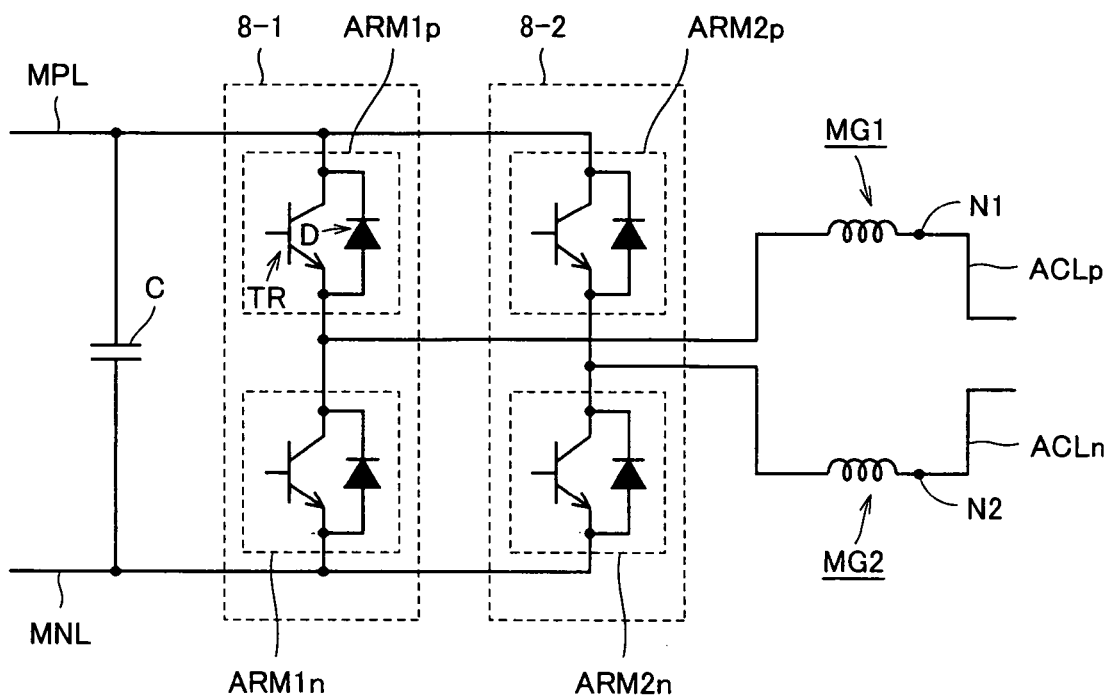
FIG. 6 is a zero-phase equivalent circuit of inverters and motor generators in a zero-phase mode.

With reference to FIG. 6, when inverters 8-1 and 8-2 perform switching operations in accordance with the zero-phase mode described above, the three upper arm circuits in inverter 8-1 are collectively shown as an upper arm ARM1p, and the three lower arm circuits in inverter 8-1 are collectively shown as a lower arm ARM1n. Each of upper arm ARM1p and lower arm ARM1n is made of a switching element TR and a free-wheeling diode D. Similarly, the three upper arm circuits in inverter 8-2 are collectively shown as an upper arm ARM2p, and the three lower arm circuits in inverter 8-2 are collectively shown as a lower arm ARM2n.

The zero-phase equivalent circuit shown in FIG. 6 can be regarded as a single-phase inverter capable of converting the direct-current electric power supplied via main positive bus MPL and main negative bus MNL into single-phase alternating-current electric power, and capable of converting the single-phase alternating-current electric power inputted to neutral points N1 and N2 via electric power-receiving lines ACLp and ACLn, respectively, into direct-current electric power.

In other words, by controlling switching commands PWM1 and PWM2 in an coordinated manner to implement a zero-phase mode, it is possible to operate each of inverters 8-1 and 8-2 as a circuit equivalent to a single-phase inverter, to convert the single-phase alternating-current electric power supplied from the external power source into direct-current electric power and supply the direct-current electric power to main positive bus MPL and main negative bus MNL. Power storage device 4 is externally charged with this direct-current electric power.

The configuration that externally charges power storage device 4 is not limited to the above-described configuration. For example, it may be possible to additionally provide an electric power conversion device (e.g. an inverter) that includes a rectifying function of converting single-phase alternating-current commercial power source (e.g. having a voltage value of 100 V or 200 V) into direct-current electric power, and a direct-current step-up function capable of stepping up the voltage value of the rectified direct-current electric power to a voltage value suitable for power storage device 4.

(Configuration for Indicating the Position of the Charging Port)

With reference to FIG. 5 again, vehicle 100 according to the present embodiment further includes a power source management ECU 44 that manages power source supply to respective parts included in vehicle 100, a body ECU 46 that provides an instruction for lighting-up and shutoff of light-emitting unit 202, and a comparison ECU 48 that compares the identification signal sent by transmitter 30 in a responsive manner. Typically, each of ECUs 40, 42, 44, 46, 48 is mainly configured with a CPU, a memory unit such as a RAM or a ROM, and an input/output interface unit.

Power source management ECU 44, body ECU 46, and comparison ECU 48 are configured to be able to establish data communication with one another, and power source management ECU 44 is also configured to be able to establish data communication with HV-ECU 42. Power source management ECU 44, body ECU 46, and comparison ECU 48 coordinate to implement an operation of indicating the position of charging port 200 according to the present embodiment.

More specifically, the above-described communication unit 32 transmits a request signal toward a prescribed range periodically (e.g. every 0.3 second). If transmitter 30 exists in the range where the request signal can be received, transmitter 30 transmits an identification signal stored therein in response to the relevant request signal. Further, upon reception of the identification signal from transmitter 30, communication unit 32 outputs the received identification signal to comparison ECU 48.

Comparison ECU 48 compares the identification signal provided from communication unit 32 with a predetermined value, and if both of them match with each other, senses the identification signal and notifies a matching notification to power source management ECU 44. In contrast, if both of them do not match with each other, the subsequent processing is not performed. Transmitter 30 corresponding to vehicle 100 is allocated a unique identification signal (that is not shared with other transmitters), making it possible to specify an owner (user) of vehicle 100.

Upon reception of the matching notification from comparison ECU 48, power source management ECU 44 notifies a lighting-up request for providing an instruction for lighting of light-emitting unit 202 to body ECU 46. Body ECU 46, which has received the lighting-up request, activates lighting-up command LON. By lighting-up command LON being activated, relay unit 36 is driven into a conduction state, and electric power is supplied from auxiliary equipment battery SB to light-emitting unit 202 via low-voltage supply line DCL. As a result, light-emitting unit 202 is lit up, and the user is notified of the position of charging port 200.

Body ECU 46 may receive illuminance around vehicle 100, which is detected by an illuminance sensor 34, and based on the illuminance, determine whether or not light-emitting unit 202 should be lit up. In other words, if illuminance around vehicle 100 is sufficiently high when the lighting-up request is received from power source management ECU 44, the user is assumed to be able to visually perceive the position of light-emitting unit 202 with ease, and hence light-emitting unit 202 is kept in a shutoff state to suppress unnecessary consumption of electric power. As an example, illuminance sensor 34 is provided in proximity to a windshield or the like, and outputs a signal value corresponding to the illuminance.

Further, a coupling-detection sensor 210a for detecting a coupling state of charging connector 250 and charging port 200 is provided at vehicle 100 inside or in proximity to electric power-receiving unit 210. After charging connector 250 is coupled to charging port 200, coupling-detection sensor 210a outputs a coupling state signal CON to HV-ECU 42 and power source management ECU 44.

In response to coupling state signal CON, HV-ECU 42 starts outputting switching commands PWM1, PWM2 and PWC so as to start the above-described external charging operation. In accordance with switching commands PWM1, PWM2, and PWC, inverters 8-1 and 8-2 and step-up/down converter 6 start an electric power converting operation, respectively.

Further, power source management ECU 44 notifies a shutoff request to body ECU 46, immediately after the reception of coupling state signal CON, or at an elapse of a prescribed period from the time point at which coupling state signal CON was received. When receiving the shutoff request, body ECU 46 deactivates lighting-up command LON. As a result, light-emitting unit 202 returns to the shutoff state from the lighting-up state. In other words, once charging connector 250 is coupled to charging port 200, it is not necessary for the user to search for charging port 200, and thus light-emitting unit 202 is shut off to suppress unnecessary consumption of electric power.

Power source management ECU 44 also notifies a shutoff request to body ECU 46 in the case that a prescribed period has elapsed after the lighting-up request was notified to body ECU 46, with coupling state signal CON not being received. In other words, if charging connector 250 is not coupled within the prescribed period after the lighting-up of light-emitting unit 202, it is determined that the user does not intend to perform external charging, so that light-emitting unit 202 is shut off.

(Process Flow)

The processing operation for indicating the position of charging port 200 as described above is comprehensively illustrated in a process flow shown in FIG. 7. Each step in the process flow shown in FIG. 7 is implemented typically by HV-ECU 42, power source management ECU 44, body ECU 46, and comparison ECU 48 each executing a program. The process flow shown in FIG. 7 is typically executed in a state that allows external charging, namely, in an IG (ignition) off state (system halt state of vehicle 100), in a prescribed cycle (e.g. every 100 msec).

With reference to FIG. 7, comparison ECU 48 determines whether or not an identification signal has been received from transmitter 30 (step S100). Here, communication unit 32 transmits a request signal in every prescribed period, and if a user that carries transmitter 30 is approaching the prescribed range centered at communication unit 32, comparison ECU 48 receives the identification signal sent from transmitter 30 in a responsive manner.

If the identification signal cannot be received from transmitter 30 (NO in step S100), comparison ECU 48 repeatedly executes the processing in step S100.

In contrast, if the identification signal can be received from transmitter 30 (YES in step S100), comparison ECU 48 compares the received identification signal with a value stored in advance, and determines whether or not both of them match with each other (step S102). If the received identification signal does not match with the value stored in advance (NO in step S102), the subsequent processing is not executed, and the procedure is returned to the initial processing.

If the received identification signal matches with the value stored in advance (YES in step S102), comparison ECU 48 notifies a matching notification to power source management ECU 44 (step S104). In response to the matching notification, power source management ECU 44 notifies a lighting-up request to body ECU 46 (step S106). In response to the lighting-up request, body ECU 46 determines whether or not illuminance detected at illuminance sensor 34 is at least a predetermined threshold value (step S108). If the illuminance detected at illuminance sensor 34 is not at least the predetermined threshold value (NO in step S108), the subsequent processing is not executed, and the procedure is returned to the initial processing.

If the illuminance detected at illuminance sensor 34 is at least the predetermined threshold value (YES in step S108), body ECU 46 activates lighting-up command LON (step S110). Relay unit 36 is then driven into a conduction state, and light-emitting unit 202 is lit up (step S112).

After light-emitting unit 202 is lit up, power source management ECU 44 determines whether or not coupling state signal CON has been received from coupling-detection sensor 210a (step S114). As described above, coupling state signal CON is generated by the user coupling charging connector 250 to charging port 200.

If coupling state signal CON cannot be received from coupling-detection sensor 210a (NO in step S114), power source management ECU 44 determines whether or not the time elapsed from the lighting-up of light-emitting unit 202 exceeds a prescribed period (step S116). If the time elapsed from the lighting-up does not exceed the prescribed period (NO in step S116), the processing in the steps so far from step S114 is repeatedly executed.

In contrast, if power source management ECU 44 receives coupling state signal CON from coupling-detection sensor 210a (YES in step S114), or the time elapsed from the lighting-up of light-emitting unit 202 exceeds the prescribed period (YES in step S116), power source management ECU 44 notifies a shutoff request to body ECU 46 (step S118). In response to the notification of the shutoff request, body ECU 46 deactivates lighting-up command LON (step S120). Relay unit 36 is then shifted to a non-conduction state, and light-emitting unit 202 is shut off (step S122). The procedure is then returned to the initial processing.

Description will be given on the correspondence between the configuration shown in the first embodiment of the present invention and the configuration of the present invention. Electric power-receiving unit 210 corresponds to an "electric power-receiving unit", communication unit 32 and comparison ECU 48 correspond to a "sensing unit", light-emitting unit 202 corresponds to a "light-emitting unit", and power source management ECU 44 corresponds to a "determination unit".

According to the first embodiment of the present invention, when the user that carries transmitter 30 merely approaches the prescribed range of electric-powered vehicle 100, an operation of indicating the position of charging port 200 is performed, in other words, light-emitting unit 202 is lit up to notify the user of the position of charging port 200. Therefore, when the user approaches electric-powered vehicle 100 while carrying transmitter 30 as well as charging connector 250 for external charging, the user can easily find out the position of the charging connector even if the surroundings of electric-powered vehicle 100 are dark or an ambient noise is large. The user can thereby start the external charging quickly.

Further, according to the first embodiment of the present invention, light-emitting unit 202 is lit up when illuminance detected at illuminance sensor 34 is at least a predetermined threshold value. It is therefore possible to suppress an unnecessary lighting-up operation and suppress excessive consumption of auxiliary equipment electric power.

Second Embodiment

In the first embodiment of the present invention described above, illustration has been made on the configuration that uses light to indicate the position of the charging port to the user. In contrast, in a second embodiment of the present invention, description will be made on a configuration that uses a sound to indicate the position of the charging port.

A system for externally charging an electric-powered vehicle 100A according to the second embodiment of the present invention, a position where a charging port 200A is disposed, and the like, are the same as those in FIG. 1 and FIG. 2, and thus the detailed description thereof will not be repeated.

Figure 8A:
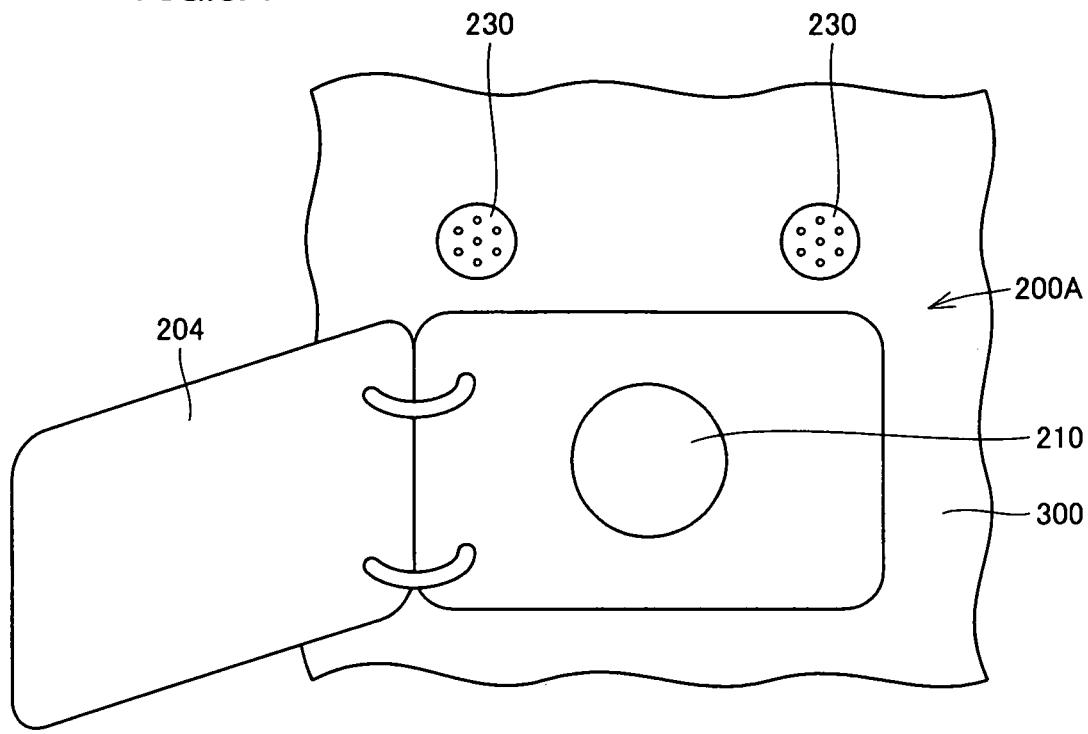
FIG. 8A and FIG. 8B are external views of a charging port and its surroundings according to a second embodiment of the present invention.
Figure 8B:
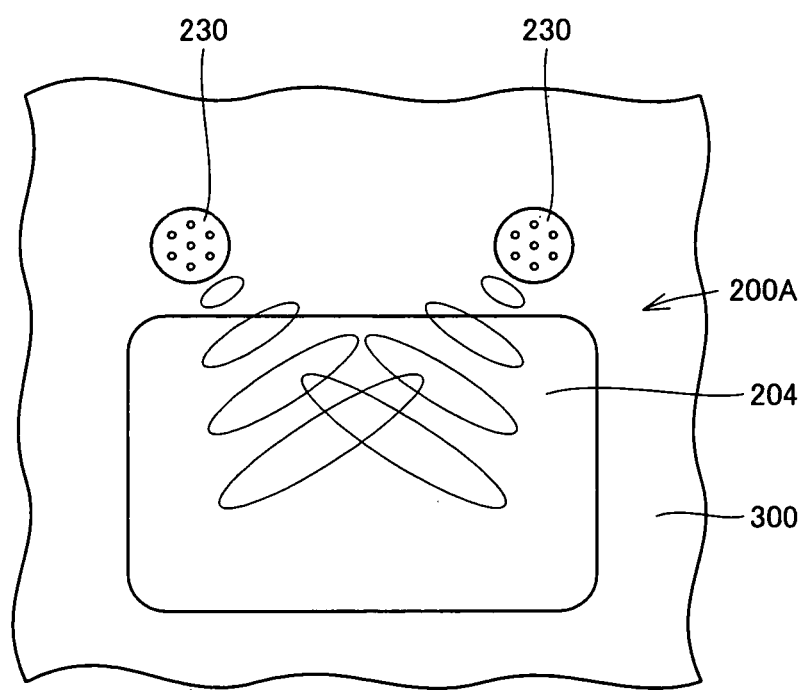

FIG. 8A and FIG. 8B are external views of charging port 200A and its surroundings according to the second embodiment of the present invention. FIG. 8A shows an opened state of lid portion 204, while FIG. 8B shows a closed state of lid portion 204.

With reference to FIG. 8A and FIG. 8B, charging port 200A according to the second embodiment is provided with a sound-generating unit 230, instead of light-emitting unit 202 as shown in FIG. 3A and FIG. 3B. Sound-generating unit 230 is for notifying a user of the position of charging port 200A, and generates a sound (indicating sound) propagating from charging port 200A to the external space. Typically, sound-generating unit 230 is made of a speaker device that relatively limits the sound diffusion range and relatively increases directivity. For example, by disposing two sound-generating units 230 in proximity to an upper portion of charging port 200A, it is possible to generate a sound having its directivity much more increased. By increasing directivity as such, the user can grasp a source of the sound (charging port 200A) by the auditory sense. Such a speaker device that relatively increases directivity is well known, and hence the description thereof in further detail will not be made. How to dispose sound-generating unit 230 is not limited thereto. Further, the sound generated by sound-generating unit 230 is not necessarily the one having its directivity increased.

In electric-powered vehicle 100A according to the second embodiment, only when a user that carries transmitter 30 exists in a prescribed range centered at communication unit 32, a sound is generated from sound-generating unit 230. Furthermore, the sound outputted from sound-generating unit 230 is preferably changed in accordance with the positional relation between the user and charging port 200A, so as to guide the user to charging port 200A in a more reliable manner.

Figure 9:
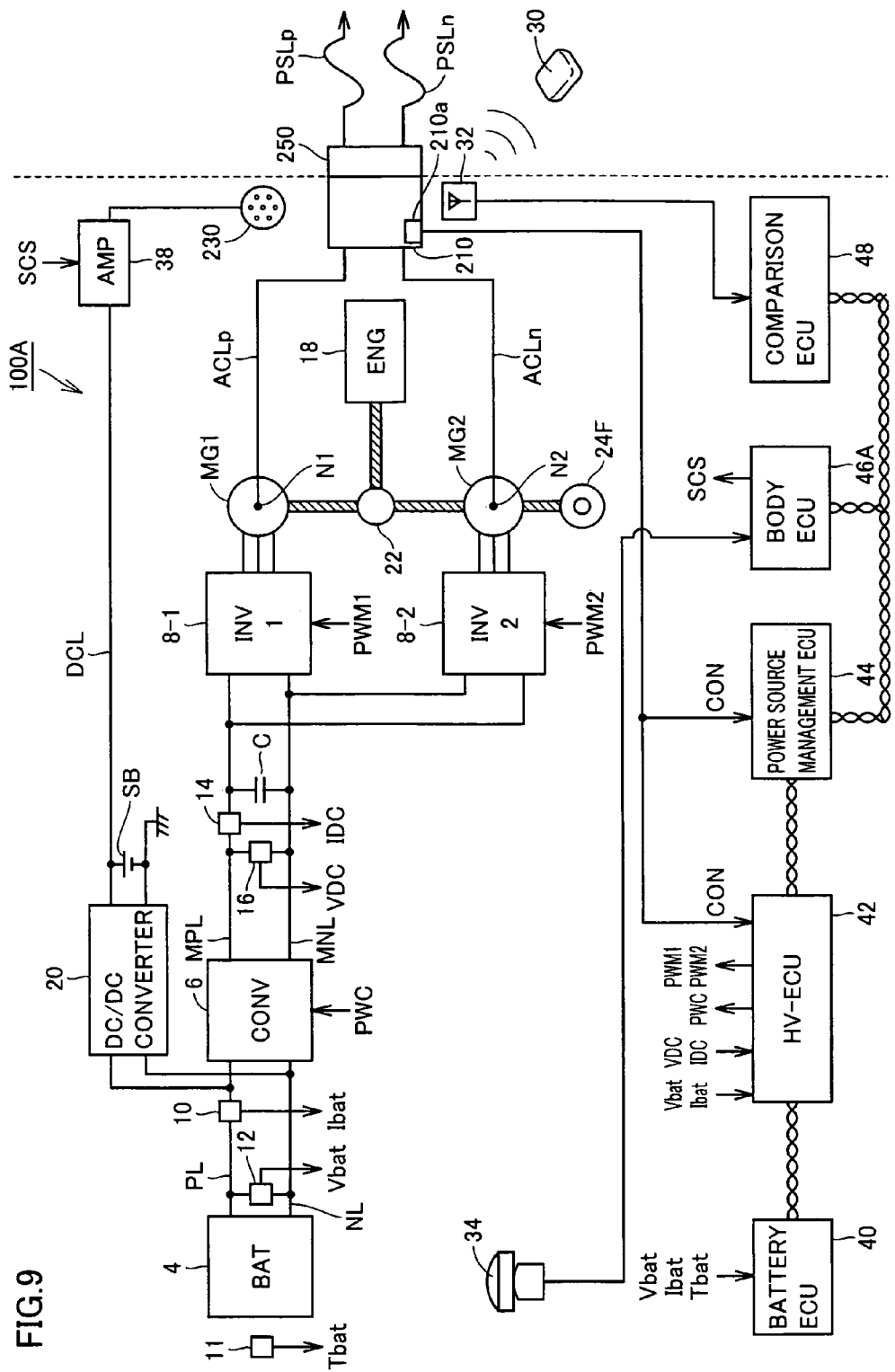
FIG. 9 is a schematic configuration diagram of an electric-powered vehicle according to the second embodiment of the present invention.

FIG. 9 is a schematic configuration diagram of electric-powered vehicle 100A according to the second embodiment of the present invention.

With reference to FIG. 9, electric-powered vehicle 100A differs from electric-powered vehicle 100 according to the first embodiment of the present invention as shown in FIG. 5, in that sound-generating unit 230 and an amplification unit 38 are provided instead of light-emitting unit 202 and relay unit 36, and a body ECU 46A is provided instead of body ECU 46. Other configurations are the same as those of electric-powered vehicle 100 according to the first embodiment of the present invention described above, and hence the detailed description thereof will not be repeated.

Amplification unit 38 generates a prescribed sound signal, amplifies the sound signal to a prescribed level, and provides the amplified sound signal to sound-generating unit 230, in accordance with a sound command SCS from body ECU 46A. More specifically, amplification unit 38 changes a volume, a tempo, a rhythm, a melody, and the like of the sound generated from sound-generating unit 230, in accordance with sound command SCS. Amplification unit 38 operates by the auxiliary equipment electric power supplied via low-voltage supply line DCL.

In response to a sound generation request notified from power source management ECU 44 to body ECU 46A upon reception of the matching notification from comparison ECU 48, body ECU 46A allows sound-generating unit 230 to continuously generate a sound. In the second embodiment, as long as the identification signal is received from transmitter 30, power source management ECU 44 continuously outputs the sound generation request. In other words, body ECU 46A continues to allow sound-generating unit 230 to generate a sound during a period in which the user that carries transmitter 30 exists in the prescribed range centered at communication unit 32.

Further, body ECU 46A may determine that the user is approaching charging port 200A, and in accordance with the determination results, change the operational state of sound-generating unit 230. In other words, as the user approaches charging port 200A, the sound generated from sound-generating unit 230 is changed. The user can thereby perceive that he/she is approaching charging port 200A, and hence can reliably find out the position of charging port 200 with the aid of this sound.

Specifically, body ECU 46A determines a distance between charging port 200A and transmitter 30 carried by the user, based on the reception intensity of the identification signal received from transmitter 30 at communication unit 32. Such reception intensity of the identification signal is calculated by comparison ECU 48, and provided to body ECU 46A.

Figure 10A:
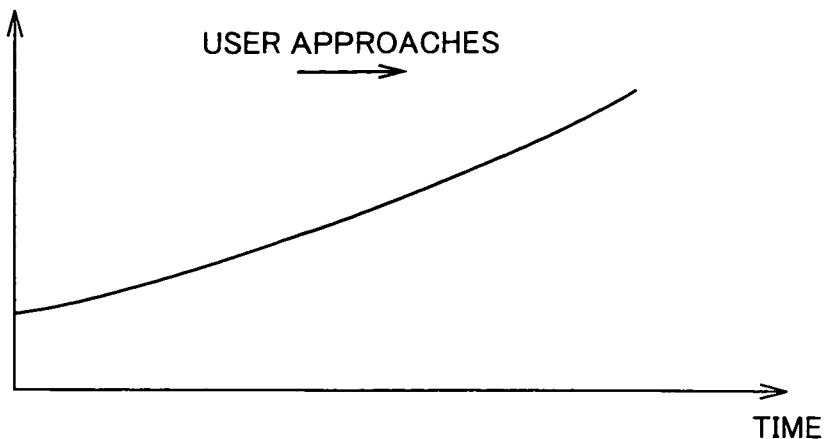
FIG. 10A to FIG. 10C are diagrams for describing changes in sound generated from a sound-generating unit.
Figure 10B:
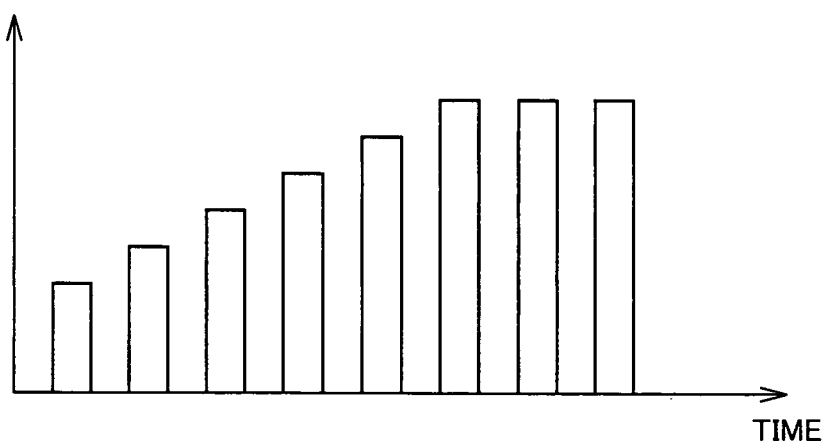
Figure 10C:
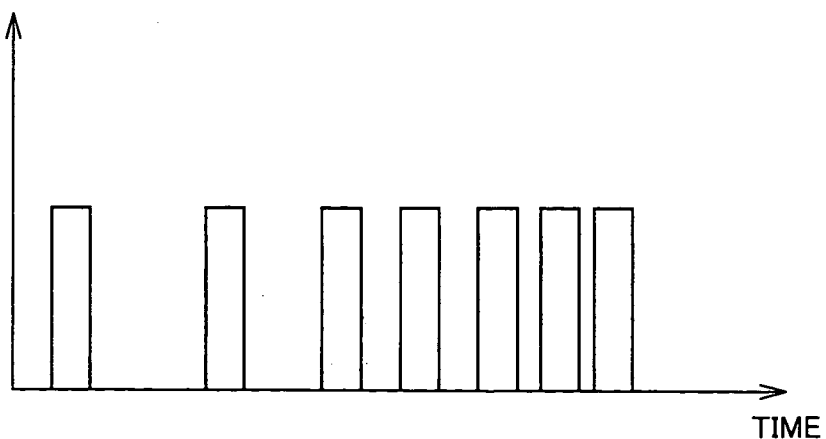

FIGS. 10A to 10C are diagrams for describing changes in sound generated from sound-generating unit 230. FIG. 10A shows an example of temporal changes in reception intensity of the identification signal at communication unit 32. FIG. 10B shows an example of temporal changes in intensity of the sound generated from sound-generating unit 230, the example corresponding to FIG. 10A. FIG. 10C shows another example of temporal changes in intensity of the sound generated from sound-generating unit 230, the example corresponding to FIG. 10A. FIG. 10B and FIG. 10C show the case that a beep (typically a repetition of a "bleeping" sound, (a pause), a "bleeping" sound, (a pause)) is generated from sound-generating unit 230.

With reference to FIG. 10A, as the user that carries transmitter 30 approaches charging port 200A, as an example, the reception intensity of the identification signal 15 received at communication unit 32 is increased. In accordance with the changes in reception intensity, body ECU 46A increases the intensity of the sound generated from sound-generating unit 230 (FIG. 10B), as an example. In other words, as the user approaches charging port 200A, the beep he/she can hear becomes large, so that the user can be guided by the beep to reliably find out the position of charging port 200A.

Further, as shown in FIG. 10C, the tempo of the beep, namely, the time interval between a "bleeping" sound and the subsequent "bleeping" sound may be changed such that it is gradually decreased.

As such, sound-generating unit 230 changes its operational state in accordance with the distance between charging port 200A and transmitter 30 carried by the user.

The sound generated from sound-generating unit 230 is not limited to a beep, and may also be a sound message such as "The charging port is here".

(Process Flow)

Figure 11:
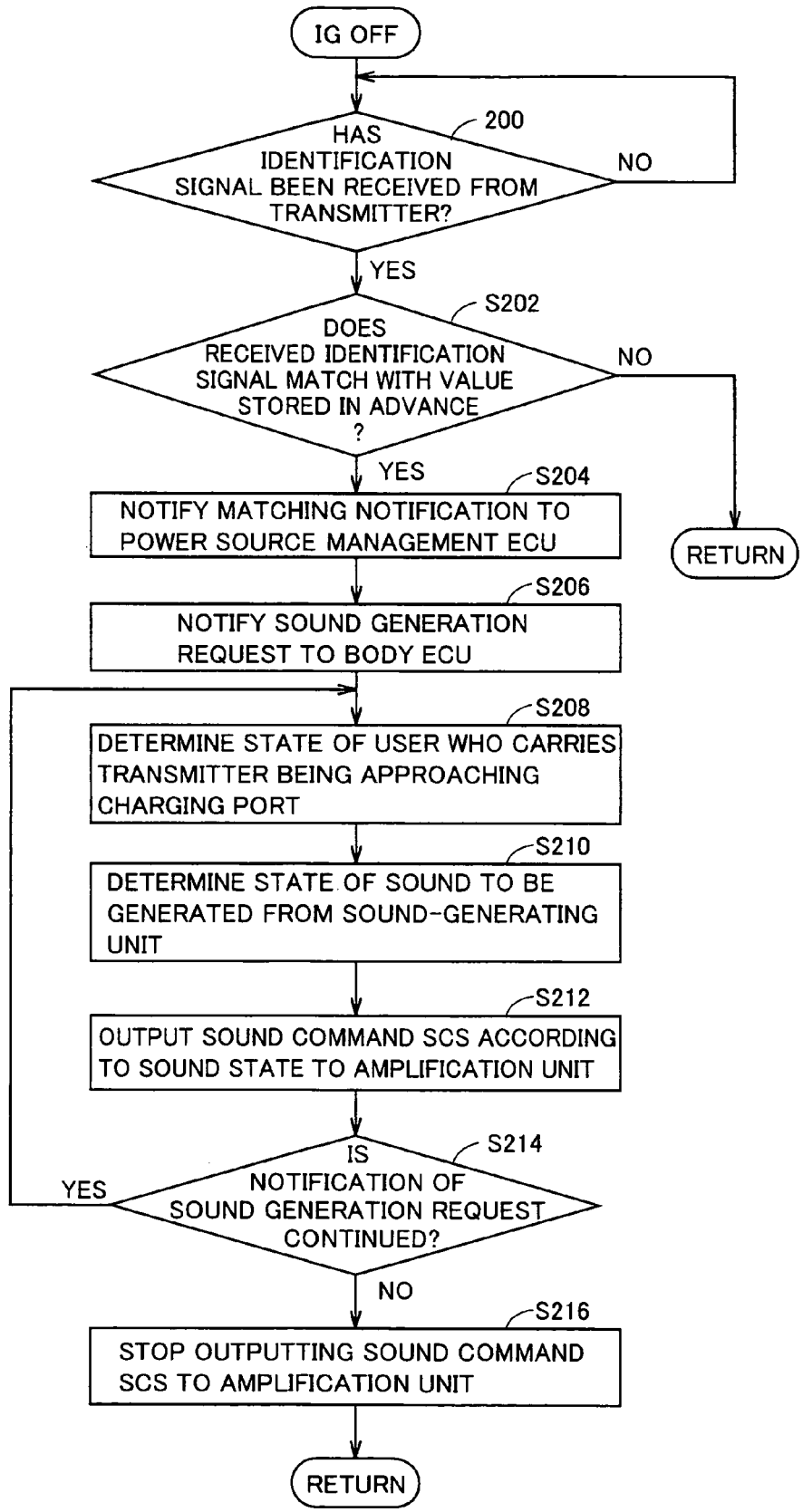
FIG. 11 is a flowchart that shows a procedure for indicating the position of the charging port according to the second embodiment of the present invention.

The processing operation for indicating the position of charging port 200A as described above is summarized in a process flow shown in FIG. 11. Each step in the process flow shown in FIG. 11 is implemented typically by HV-ECU 42, power source management ECU 44, body ECU 46A, and comparison ECU 48 each executing a program. The process flow shown in FIG. 11 is typically executed in a state that allows external charging, namely, in an IG (ignition) off state (system halt state of vehicle 100A), in a prescribed cycle.

With reference to FIG. 11, comparison ECU 48 determines whether or not an identification signal has been received from transmitter 30 (step S200). If the identification signal cannot be received from transmitter 30 (NO in step S200), comparison ECU 48 repeatedly executes the processing in step S200.

In contrast, if the identification signal can be received from transmitter 30 (YES in step S200), comparison ECU 48 compares the received identification signal with a value stored in advance, and determines whether or not both of them match with each other (step S202). If the received identification signal does not match with the value stored in advance (NO in step S202), the subsequent processing is not executed, and the procedure is returned to the initial processing.

If the received identification signal matches with the value stored in advance (YES in step S202), comparison ECU 48 notifies a matching notification to power source management ECU 44 (step S204). In response to the matching notification, power source management ECU 44 notifies a sound generation request to body ECU 46A (step S206). In response to the sound generation request, body ECU 46A determines the state of the user who carries transmitter 30 being approaching charging port 200A (step S208). In accordance with the determination results, body ECU 46A determines the state of the sound to be generated from sound-generating unit 230 (a volume, a tempo, and the like) (step S210). Furthermore, body ECU 46A outputs sound command SCS according to the sound state determined in step S210 to amplification unit 38 (step S212). The sound for indicating the position of charging port 200A to the user is thereby generated from sound-generating unit 230.

Further, body ECU 46A determines whether or not the notification of the sound generation request is continued (step S214). If the notification of the sound generation request is continued (YES in step S214), the processing in the steps so far from step S208 is repeated.

In contrast, if the notification of the sound generation request is not continued (NO in step S214), body ECU 46A stops outputting sound command SCS to amplification unit 38 (step S216), and the procedure is returned to the initial processing.

Description will be made on the correspondence between the configuration shown in the second embodiment of the present invention and the configuration of the present invention. Electric power-receiving unit 210 corresponds to an "electric power-receiving unit", communication unit 32 and comparison ECU 48 correspond to a "sensing unit", sound-generating unit 230 corresponds to a "sound-generating unit", and power source management ECU 44 corresponds to a "determination unit".

According to the second embodiment of the present invention, when the user that carries transmitter 30 merely approaches the prescribed range of electric-powered vehicle 100A, an operation of indicating the position of charging port 200A is performed, in other words, generation of a sound (indicating sound) from sound-generating unit 230 is started to notify the user of the position of charging port 200A. Therefore, when the user approaches electric-powered vehicle 100A while carrying transmitter 30 as well as charging connector 250 for external charging, the user can easily find out the position of the charging connector regardless of whatever brightness the surroundings of electric-powered vehicle 100A might have, or even in the case that the user is visually impaired. The user can thereby start the external charging quickly.

Further, according to the second embodiment of the present invention, the state of the user approaching charging port 200A is determined, and in accordance with the determination results, the sound generated from sound-generating unit 230 is changed. Therefore, the user can perceive that he/she is approaching charging port 200A, and thus can reliably find out the position of charging port 200A with the aid of this sound.

Modification of First and Second Embodiments

For notifying the user of the position of the charging port, description has been made on the configuration in which light-emitting unit 202 provided at a position in proximity to the charging port is lit up in the first embodiment of the present invention, and illustration has been made on the configuration in which sound-generating unit 230 generates a sound (indicating sound) in the second embodiment of the present invention.

Further, in the first embodiment of the present invention, illustration has been made on the configuration in which light-emitting unit 202 is not lit up if the illuminance around vehicle 100 is sufficiently high. In such a case, however, a sound (indicating sound) may be generated from sound-generating unit 230.

In other words, to indicate the position of the charging port, both of light-emitting unit 202 and sound-generating unit 230 may be provided, and illuminance around the vehicle may be detected by means of illuminance sensor 34, and in accordance with the detected illuminance, any one of light-emitting unit 202 and sound-generating unit 230 may selectively be operated.

Further, an acoustic sensor may be provided to detect a noise level around the vehicle, and in accordance with the detected noise level, any one of light-emitting unit 202 and sound-generating unit 230 may selectively be operated. In other words, if the noise level around the vehicle is high, light-emitting unit 202 may be lit up in addition to, or instead of, a sound generated from sound-generating unit 230.

According to the modification of the first and second embodiments of the present invention, the user can reliably find out the position of the charging port regardless of the circumstances around the vehicle.

Third Embodiment

In the first and second embodiments of the present invention described above, description has been made on the configuration that indicates the position of charging port 200 to a user that carries transmitter 30, when the user exists in a prescribed range. However, the position of the charging port may be indicated only when it is determined that power storage device 4 requires charging.

Figure 12:
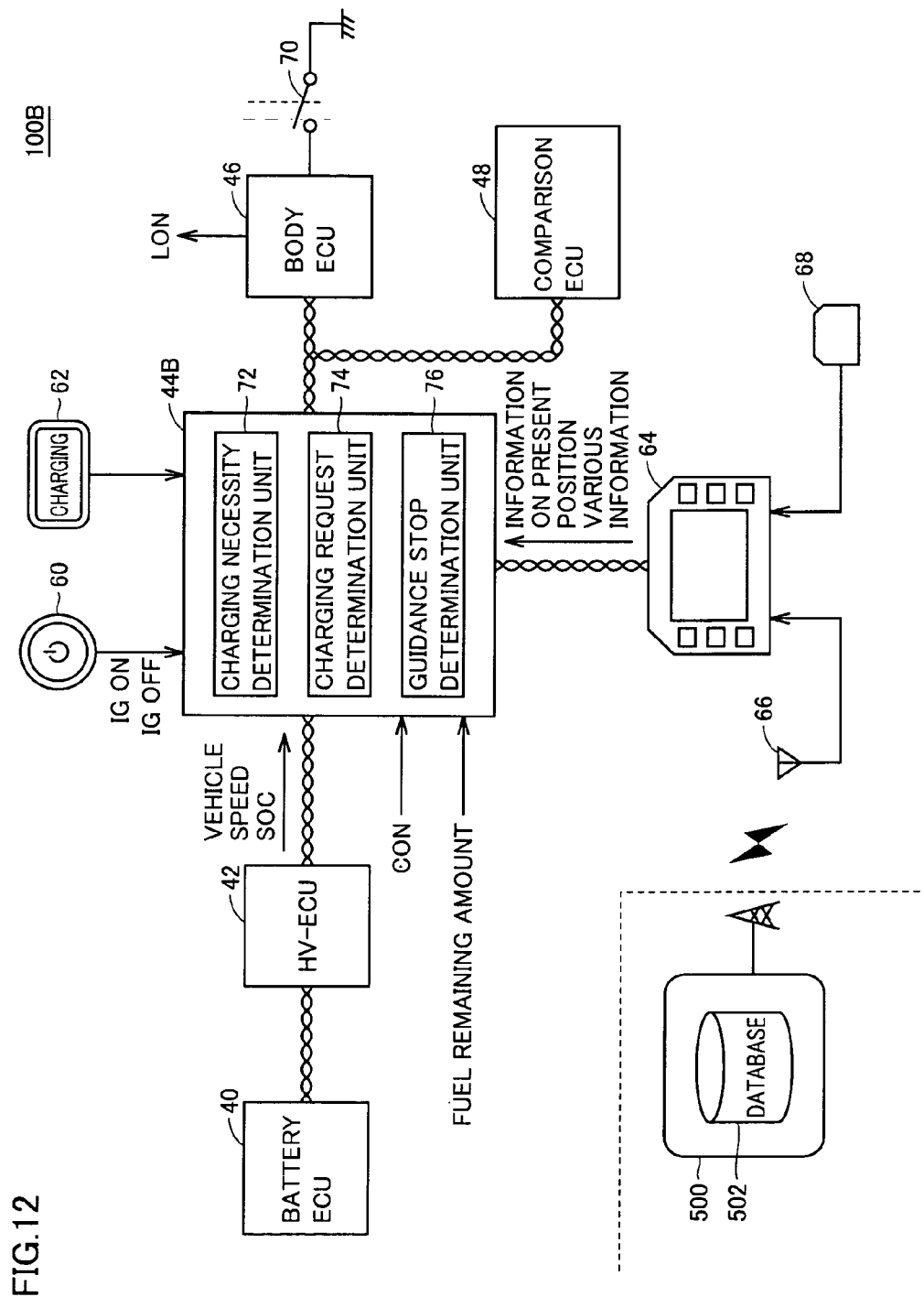
FIG. 12 is a schematic functional block diagram of an electric-powered vehicle according to a third embodiment of the present invention.

FIG. 12 is a schematic functional block diagram of an electric-powered vehicle 100B according to a third embodiment of the present invention.

With reference to FIG. 12, a power source management ECU 44B for electric-powered vehicle 100B according to the third embodiment of the present invention includes a charging necessity determination unit 72 for determining the necessity of charging power storage device 4 (FIG. 4), a charging request determination unit 74 for determining whether a user has made a charging request, and an indication stop determination unit 76 for determining when to stop the indicating operation as to charging port 200.

(Charging Necessity Determination Unit)

Charging necessity determination unit 72 typically determines the necessity of charging power storage device 4 based on the SOC calculated by battery ECU 40. More specifically, charging necessity determination unit 72 obtains the SOC from battery ECU 40 via HV-ECU 42, and if the obtained SOC is lower than a predetermined threshold value, determines that power storage device 4 requires charging. When charging necessity determination unit 72 determines that charging is necessary, power source management ECU 44B notifies a lighting-up request to body ECU 46.

Other conditions under which charging necessity determination unit 72 determines that charging is necessary, may include the case that the SOC is lower than the predetermined threshold value and an amount of fuel remaining in fuel tank 26 (fuel remaining amount) is smaller than a predetermined threshold value, and other cases.

Further, to power source management ECU 44B, a navigation device 64 is connected. Navigation device 64 is connectable to an external information server device 500 via a radio signal received and transmitted at an antenna 66. To navigation device 64, various pieces of information stored in a database 502 in information server device 500 are provided. Such information provided from database 502 can include information on price of a commercial power source, which is an example of the external power source, and other information. Therefore, charging necessity determination unit 72 may also determine the necessity of charging power storage device 4 based on the information on price increase (price rise) of the commercial power source, which is notified in advance, and other information.

(Charging Request Determination Unit)

Charging request determination unit 74 determines the presence or absence of a charging request from the user, namely, the presence or absence of a user's direct or indirect intention to perform charging, based on signals from respective units manipulated by the user. If it is determined that the user has made a charging request, power source management ECU 44B notifies a lighting-up request to body ECU 46.

Typically, charging request determination unit 74 determines whether the user has made the charging request, based on the information such as (1) information that the vehicle is in a halt state, (2) information that an IG off is provided by a manipulation of a power switch 60, (3) information that the door is opened and closed, which is detected by a door switch 70, (4) information that a user who carries transmitter 30 approaches the charging port, (5) information that the charging connector is made closer to the charging port, (6) the parking position, (7) information that a charging request has been made from a charging button 62 manipulated by the user, and other information.

As to the parking position described in (6) above, it is possible to determine whether or not an electric-powered vehicle is parked in a position that allows external charging (typically a garage of the user), based on GPS information received at a GPS antenna 68 in navigation device 64.

(Indication Stop Determination Unit)

In the first and second embodiments of the present invention described above, illustration has been made on the configuration in which an indicating operation (typically lighting-up or generation of a sound) is stopped when transmitter 30 is moved away from the prescribed range or when a prescribed period has passed after charging connector 250 was coupled to the charging port. However, still another condition may be added when the indicating operation is to be stopped.

Typically, indication stop determination unit 76 determines when to stop the indicating operation based on (1) a state that the vehicle is in a traveling state, (2) a state that an IG on is provided by manipulation of power switch 60, (3) a state that the door is opened and closed, which is detected by door switch 70, (4) a state that a user who carries transmitter 30 moves away from the charging port without coupling the charging connector thereto, and the like.

(Other Modifications)

After charging connector 250 is coupled to the charging port and external charging is started, an operation pattern of light-emitting unit 202 and sound-generating unit 230 may be changed in accordance with the state of external charging. Specifically, it may be possible to change a light-emitting pattern (e.g. blinking) or a color of the emitted light in light-emitting unit 202, or change a volume, a tempo, a rhythm, a melody and the like of a sound generated from sound-generating unit 230, in accordance with the state of external charging (during charging standby, during external charging, on completion of external charging, on termination due to abnormalities).

From the viewpoint of vehicle theft-prevention and crime prevention, it may also be possible to operate light-emitting unit 202 or sound-generating unit 230 in the case that the user moves away from the electric-powered vehicle without locking the door, and other cases.

It should be understood that the embodiments disclosed herein are illustrative and not limitative in all aspects. The scope of the present invention is shown not by the description above but by the scope of the claims, and is intended to include all modifications within the equivalent meaning and scope of the claims.

The invention claimed is:

1. A vehicle capable of utilizing electric power supplied from an external power source, comprising:
   an electric power-receiving unit for receiving the electric power;
   a sensing unit for sensing an identification signal issued from a transmitter; and
   an indication unit for indicating a position of said electric power-receiving unit, wherein
       said indication unit is activated when said identification signal sensed by said sensing unit matches with a value specific to the vehicle, and is deactivated when a connector for charging the electrical power from the external power source is coupled to the electric power-receiving unit.

2. The vehicle according to claim 1, further comprising a determination unit for determining whether or not supply of the electric power from the external power source is required, wherein
   said indication unit is activated when said determination unit determines that the supply of the electric power from the external power source is required.

3. The vehicle according to claim 1, wherein
   said sensing unit senses a distance between said vehicle and said transmitter, and
   said indication unit changes a state of activation in accordance with the distance between said vehicle and said transmitter, sensed by said sensing unit.

4. The vehicle according to claim 1, wherein
   said indication unit includes a light-emitting unit disposed in proximity to said electric power-receiving unit, and
   the activation of said indication unit includes one of lighting-up and blinking of said light-emitting unit.

5. The vehicle according to claim 4, wherein a radiating surface of said light-emitting unit is formed as a part of a surface of a vehicle main body of said vehicle.

6. The vehicle according to claim 1, wherein
   said indication unit includes a sound-generating unit disposed in proximity to said electric power-receiving unit, and
   the activation of said indication unit includes generation of a sound from said sound-generating unit.

7. The vehicle according to claim 1, further comprising
   an engine operated by combustion of fuel,
   a fuel storage unit for storing said fuel, and
   a fuel-receiving port for receiving said fuel, brought into communication with said fuel storage unit.

8. The vehicle according to claim 7, wherein
   said electric power-receiving unit is disposed on one side surface of said vehicle,
   said fuel-receiving port is disposed on the other side surface of said vehicle, and
   said indication unit is disposed on the same side surface as said electric power-receiving unit.

\* \* \* \* \*